(12) United States Patent
Niwa et al.

(10) Patent No.: US 6,616,335 B2
(45) Date of Patent: Sep. 9, 2003

(54) ROLLING ELEMENT SPACER IN ROLLING GUIDE DEVICE

(75) Inventors: Hiroshi Niwa, Tokyo (JP); Kentarou Nishimura, Tokyo (JP); Yasuyuki Abe, Tokyo (JP); Kiyomi Tamura, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 10/268,938

(22) Filed: Oct. 11, 2002

(65) Prior Publication Data

US 2003/0039414 A1 Feb. 27, 2003

Related U.S. Application Data

(62) Division of application No. 09/838,183, filed on Apr. 20, 2001, now abandoned.

(30) Foreign Application Priority Data

May 2, 2000 (JP) ........................................ 2000/133266

(51) Int. Cl.[7] ........................... F16C 29/06; F16H 25/22
(52) U.S. Cl. ......................... 384/51; 74/424.88; 384/45
(58) Field of Search ........................... 384/520, 45, 51, 384/43; 492/45; 74/424.88

(56) References Cited

U.S. PATENT DOCUMENTS

| 2,893,792 A | 7/1959 | Wikoff et al. ............... 384/520 |
| 2,897,021 A | 7/1959 | Zellman et al. ............. 384/520 |
| 3,053,105 A | 9/1962 | Cole ........................... 384/43 |
| 3,208,806 A | 9/1965 | Grolmann et al. .......... 384/520 |
| 3,455,616 A | 7/1969 | George et al. .............. 384/520 |
| 4,277,117 A | 7/1981 | George ....................... 384/520 |
| 4,761,820 A | 8/1988 | Frank et al. ................ 384/520 |
| 5,927,858 A | 7/1999 | Agari .......................... 384/520 |
| 6,095,009 A | 8/2000 | Takagi ........................ 74/459 |
| 6,113,274 A | 9/2000 | Horimoto .................... 384/43 |

FOREIGN PATENT DOCUMENTS

| GB | 1175810 | 12/1969 |
| JP | 10-281154 | 10/1998 |
| JP | 11-182545 | 7/1999 |
| JP | 11-315835 | 11/1999 |
| JP | 2000-120825 | 4/2000 |

*Primary Examiner*—Thomas R. Hannon
(74) *Attorney, Agent, or Firm*—Arent Fox Kintner Plotkin & Kahn, PLLC

(57) ABSTRACT

There is provided a rolling element spacer used in a rolling guide device having an endless circulation passage of balls, arranged alternately with many balls in the endless circulation passage, and circulating together with the balls in the endless circulation passage. It has a pair of ball holding seats each of which is formed in a concave spherical face form nearly approximating a spherical face of the ball and sliding-contacts with the ball and, around each ball holding seat, there is formed an annular dropout prevention portion protruding in a ball arranging direction than an edge portion of the ball holding seat and kept in non-contact with respect to the ball seated on the ball holding seat.

3 Claims, 7 Drawing Sheets

ROLLING ELEMENT SPACER IN ROLLING GUIDE DEVICE

This is a Division of Application Ser. No. 09/838,183 filed Apr. 20, 2001 now abandoned. The disclosure of the prior application is hereby incorporated by reference herein in its entirety.

BACKGROUND OF THE INVENTION

1. Field of the Invention

The present invention relates to a rolling element spacer which, in various rolling guide devices each having an endless circulation passage for balls such as a linear guide device and a ball screw device, is interposed between the mutually adjoining balls in the endless circulation passage and reduces frictions between the balls and a heat generation to thereby smoothen the rolling thereof.

2. Description of the Related Art

Hitherto, as a rolling guide device in which a pair of members continuously performing a relative motion through an endlessly circulating ball row, there have been known devices such as a linear guide device which is used in a linear guide portion in a machine tool, a carrying device and the like and which guides a movable body such as a table on a stationary portion such as a bed or a saddle, and a ball screw which is used together with this linear guide device and which gives a stroke of a linear motion corresponding to a rotation amount of a motor to the movable body.

The former linear guide device comprises a bearing rail which is disposed on the stationary portion and in which a rolling groove for the balls is formed along a longitudinal direction, and a sliding base which has a load rolling groove facing the rolling groove of the bearing rail through many balls and in which there is formed an endless circulation groove for the balls rolling on the load rolling groove, and it is constituted such that, in accompaniment with the endless circulation of the balls, the sliding base supporting the movable body continuously performs the linear motion along the bearing rail. Further, reversely to this, there is a case where it is constituted such that the bearing rail is moved relative to the fixed sliding base.

On the other hand, the latter ball screw comprises a screw shaft in which there is formed a spiral ball rolling groove with a predetermined lead, and a nut member which has a load rolling groove facing the ball rolling groove through many balls and in which there is formed an endless circulation passage for the balls rolling on the load rolling groove, and it is constituted such that, in accompaniment with a relative rotation motion between the screw shaft and the nut member, the balls circulate in the endless circulation passage, and the nut member and the screw shaft relatively move in an axial direction.

On the other hand, in such a rolling guide device, since the individual ball circulating in the endless circulation passage mutually contacts with the balls positioned before and after it, in case that it is used at a high speed, there have been such possibilities that, besides the fact that the balls are worn in relatively short time by a friction between the balls for instance, there arises a disadvantage such as the fact that the ball or the load rolling groove generates a seizure owing to a friction heat. Further, when reversing a motion direction, i.e., when reversing a circulation direction, an arrangement of the balls in the endless circulation passage is liable to be disturbed and, in an extreme case, there arises a so-called lock phenomenon in which the balls clog in the endless circulation passage, so that there has been a possibilities that the rolling guide device itself becomes impossible to operate. Therefore, as one for solving such drawbacks, in Japanese Patent Laid-Open No. 315835/1999 Gazette, there is disclosed a rolling guide device in which a rolling element spacer is interposed between the balls mutually adjoining in the endless circulation passage.

In the rolling guide device disclosed in the above Gazette, it is adapted such that a synthetic resin made rolling element spacer referred to as separator is arranged alternately with the ball in the endless circulation passage, thereby preventing the balls from mutually contacting. Such a separator is formed in a disk-like form whose outer diameter is smaller than a diameter of the ball and, in its both front/rear faces contacting with the balls, there are formed ball holding seats whose curvatures are larger than a curvature of a spherical face of the ball. By this, if the ball and the separator are alternately arranged without a gap in the endless circulation passage, each ball becomes a state of being sandwiched by a pair of separators adjoining before and after it, so that it circulates in the endless circulation passage together with the separators without disturbing a row even when reversing the circulation direction.

However, like the rolling element spacer shown in the Japanese Patent Laid-Open No. 315835/1999 Gazette, if the ball holding seat which sliding-contacts with the ball is formed in a concave curved face form whose curvature is larger than the spherical face of the ball, since a gap is formed between a peripheral edge portion of the ball holding seat and the ball, the ball rocks with respect to the rolling element spacer, so that there is a problem that it is impossible to completely eliminate a meander of the balls in the endless circulation passage.

On the other hand, from a viewpoint of preventing the meander of the balls in the endless circulation passage, it is necessary that the ball settles on the ball holding seat of the rolling element spacer without rocking, and therefor it is necessary that ball holding seat is formed in a concave spherical face form nearly approximating the spherical face of the ball. However, in case that the ball holding seat is formed in such a concave spherical face form, a contact area between the ball and the ball holding seat becomes large, so that there are possibilities of an increase in sliding contact resistance of the rolling element spacer with respect to the ball, a premature wear of the rolling element spacer, and the like.

Further, in case that the ball holding seat is designed such that its diameter is small in order to avoid the increase in sliding contact resistance with respect to the ball, there has been a disadvantage that the rolling element spacer falls out from between the mutually adjoining balls even if a slight gap is generated between the ball and the rolling element spacer.

SUMMARY OF THE INVENTION

The invention has been made in view of such a problem, and its object is to provide a rolling element spacer which makes a sitting of the ball with respect to the ball holding seat good to thereby intend to stabilize an alignment of the balls and the rolling element spacers in the endless circulation passage, can reduce the sliding contact resistance acting to the ball, and can effectively prevent the rolling element spacer from falling out from between the balls.

In order to achieve the above object, the invention provides a rolling element spacer used in a rolling guide device in which a pair of members perform a relative continuous motion through an endlessly circulating ball row, interposed between balls mutually adjoining in its endless circulation passage, and circulating together with the balls, characterized in that it has a pair of ball holding seats each of which is formed in a concave spherical face form nearly approximating a spherical face of the ball and sliding-contacts with the ball and, around each ball holding seat, there is formed an annular dropout prevention portion protruding in a ball arranging direction than an edge portion of the ball holding seat and kept in non-contact with respect to the ball seated on the ball holding seat.

According to such a technical means, since the ball folding seat with which the ball sliding-contacts is formed in the concave spherical face form nearly approximating the spherical face of the ball, a gap is scarcely formed between the spherical face of the ball and the ball holding seat, so that the siting of the ball with respect to the ball holding seat is stabilized. Therefore, in case that the rolling element spacers and the balls are alternately arranged in the endless circulation passage of the rolling guide device, it is intended to stabilize the alignment of the balls and the rolling element spacers, so that it become possible to prevent a meander of the balls in the endless circulation passage.

Further, since the annular dropout prevention portion kept in non-contact with respect to the ball is formed around the ball holding seat and the dropout prevention portion protrudes in the ball arranging direction than the edge portion of the ball holding seat, even if a gap is generated between the ball and the rolling element spacer and thus the rolling element spacer becomes likely to fall out from between the mutually adjoining balls, it becomes possible to prevent beforehand a dropout accident of the rolling element spacer by the fact that the dropout prevention portion engages with the ball. Accordingly, since a diameter of the ball holding seat can be determined irrespective of the dropout of the rolling element spacer and thus the ball holding seat can be formed in a size as minimum as necessary, it becomes possible to make a contact area between the ball holding seat and the ball small, thereby reducing the sliding contact resistance acting to the ball. Further, since the dropout prevention portion is kept in non-contact with respect to the ball under a state that the ball seats on the ball holding seat, there is no case that the sliding contact resistance acting to the ball increases, by the fact that the dropout prevention portion is provided.

In case that the ball holding seat is formed in the concave spherical face form nearly approximating the spherical face of the ball, since a peripheral edge portion of the ball holding seat contacts with the spherical face of the ball, a lubricant adhered on the ball is scraped by the peripheral edge portion, so that the ball is liable to come into a state of insufficient lubrication. However, according to the rolling element spacer of the invention, since the dropout prevention portion provided around the ball holding seat is kept in non-contact with the spherical face of the ball, the lubricant is liable to enter into the gap between the dropout prevention portion and the ball, so that a lubricating state of the ball can be maintained well even in case that the ball holding seat is formed in the concave spherical face form nearly approximating the spherical face of the ball. Accordingly, from a viewpoint of making a holding state of the lubricant in the rolling element spacer of the invention further good, it is preferable to form an annular groove between the ball holding seat and the dropout prevention portion surrounding it and utilize this annular groove as a lubricant sump. If constituted in this manner, since the lubricant flowing into the gap between the ball and the dropout prevention portion is stored in the annular groove, it becomes possible to always apply the lubricant to a surface of the ball.

On the other hand, in the endless circulation passage of the rolling guide device, since it is difficult to completely eliminate a gap between the ball and the rolling element spacer, it follows that the rolling element spacer and the ball are repeating collisions bit by bit during a circulation of the balls. Therefore, from a viewpoint of reducing a fatigue and decreasing a collision noise of the balls owing to such collisions, it is preferable that the ball holding seat with which the ball sliding-contacts is formed of a suitably soft material. In contrast to this, since the dropout prevention portion is one for preventing the rolling element spacer from falling out from between the mutually adjoining balls, it must not be easily deformed by being pushed by the ball in case that such a situation occurs, so that it is preferable that it is formed of a hard material. Accordingly, from such a viewpoint, it is preferable that the ball holding seat and the dropout prevention portion provided in the rolling element spacer of the invention are molded respectively by different resin materials, and the dropout prevention portion is molded by the resin material harder than the ball holding seat.

Incidentally, the dropout prevention portion may be formed in a continuous annular form, but the dropout prevention portion may be made by providing a protrusion separated by a slit in the annular form.

As explained above, according to the rolling element spacer of the invention, since each of a pair of ball holding seats with which the balls sliding-contact is formed in the concave spherical face form nearly approximating the spherical face of the ball and, around each ball holding seat, there is formed the annular dropout prevention portion protruding in the ball arranging direction than the edge portion of the ball holding seat and kept in non-contact with respect to the ball seated on the ball holding seat, it is possible to intend to stabilize the alignment of the balls and the rolling element spacers in the endless circulation passage while making the sitting of the ball with respect to the ball holding seat good and intend to decrease the sliding contact resistance acting to the ball, and additionally it becomes possible to effectively prevent the rolling element spacer from falling out from between the balls.

DESCRIPTION OF THE PREFERRED EMBODIMENTS

Hereunder, a rolling element spacer of the invention is detailedly explained on the basis of the drawings.

Figure 1:
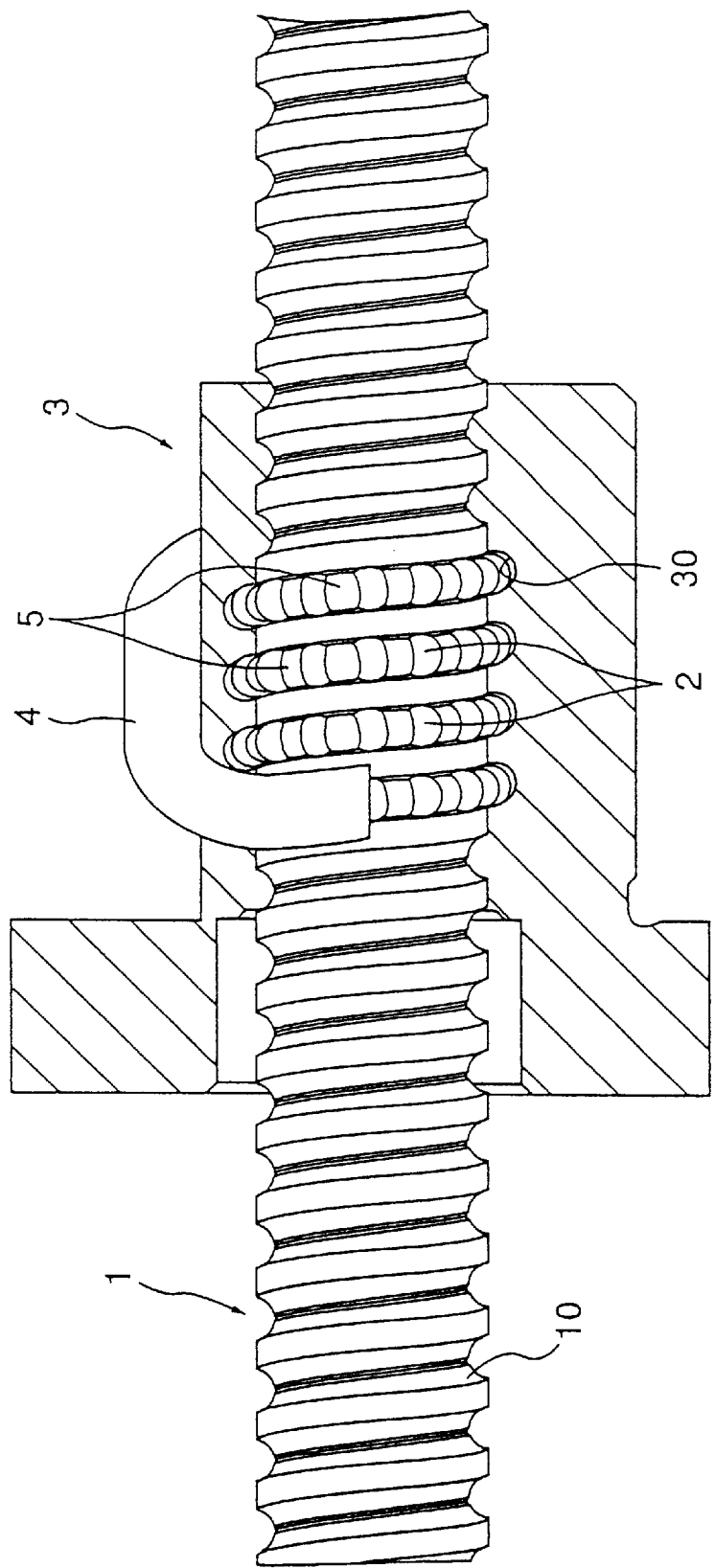
FIG. 1 is a side sectional view showing one embodiment of a ball screw device in which rolling element spacers of the invention are arranged together with balls in an endless circulation passage.
Figure 2:
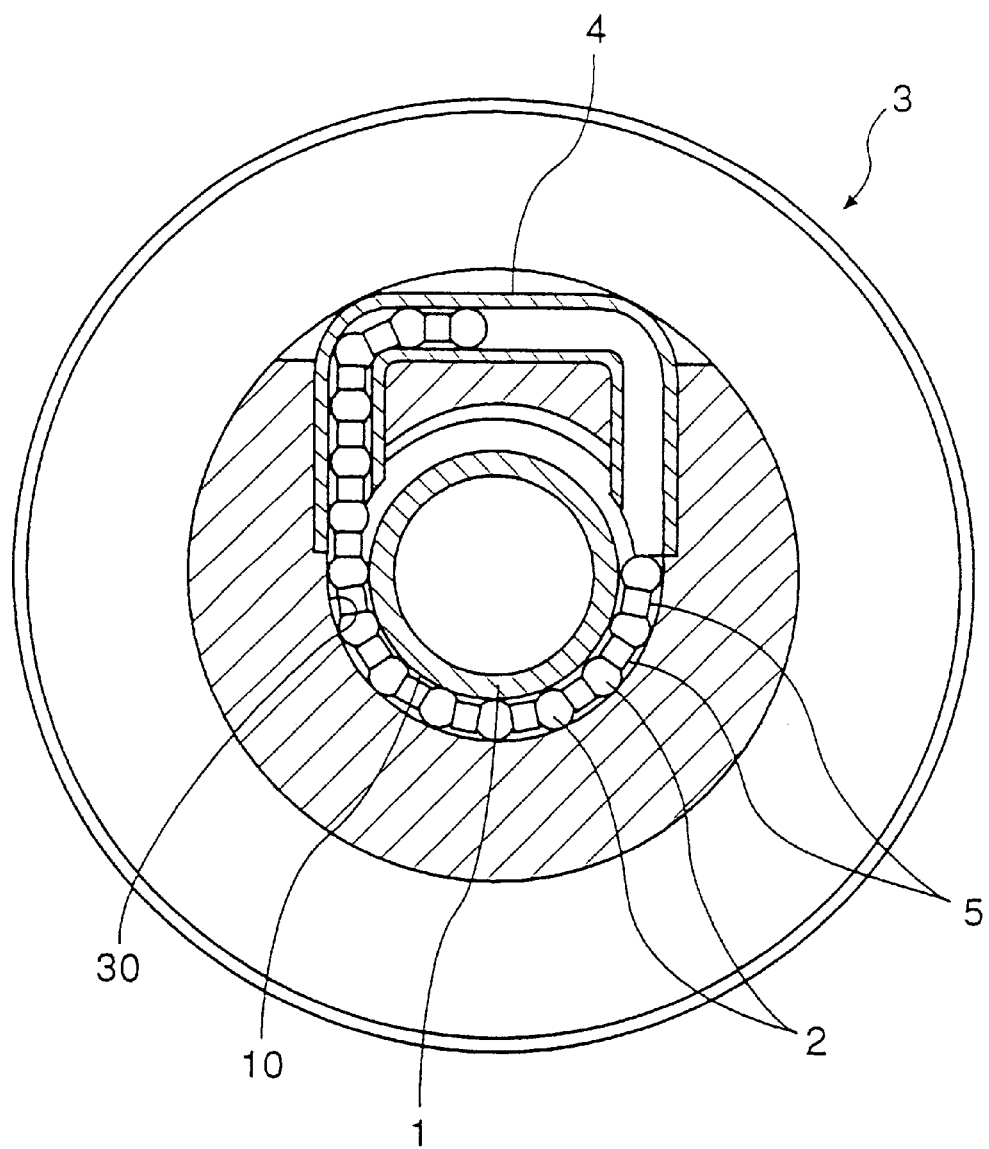
FIG. 2 is a front sectional view of the ball screw device shown in FIG. 1.

FIG. 1 and FIG. 2 show one embodiment of a ball screw device in which the rolling element spacers of the invention are arranged together with balls in an endless circulation passage. In these drawings, the reference numeral 1 denotes a screw shaft, the reference numeral 2 a ball and the reference numeral 3 a nut member, and the nut member 3 meshes with the screw shaft 1 through many balls 2.

A spiral ball rolling groove 10 is formed in an outer periphery face of the screw shaft 1, while a spiral load rolling groove 30 facing the ball rolling groove 10 of the screw shaft 1 is formed in an inner periphery face of the nut member 3, and the ball rolling groove 10 and the load rolling grove 30 form a spiral load ball passage between the screw shaft 1 and the nut member 3. That is, if a relative rotary motion occurs between the screw shaft land the nut member 3, the ball 2 spirally rolls in the load ball passage while bearing a load. Further, a return pipe 4 mutually communicating both ends of the load ball passage to thereby constitute the endless circulation passage for the balls 2 is attached to the nut member 3, so that the ball 2 having finished rolling in the load ball passage and having been released from the load becomes a no-load state and rolls in the return pipe 4, and is returned to an inlet of the load ball passage while jumping the ball rolling groove 10 by several turns. Accordingly, if the screw shaft 1 and the nut member 3 are relatively rotated, it follows that the ball 2 rolls from the load ball passage to the return pipe 4 and from the return pipe 4 to the load ball passage, and is circulated inside the endless circulation passage constituted by the load ball passage and the return pipe 4.

Figure 3:
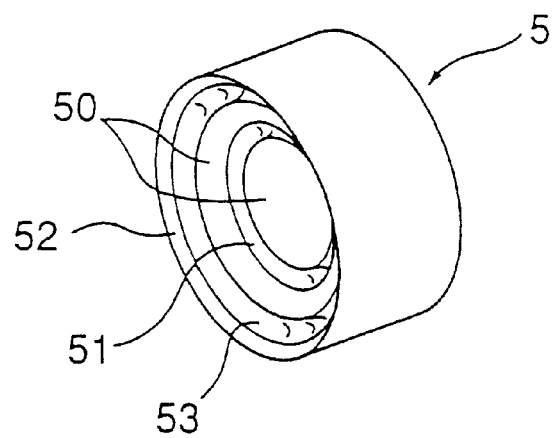
FIG. 3 is a perspective view showing a 1st embodiment of the rolling element spacer of the invention.
Figure 4:
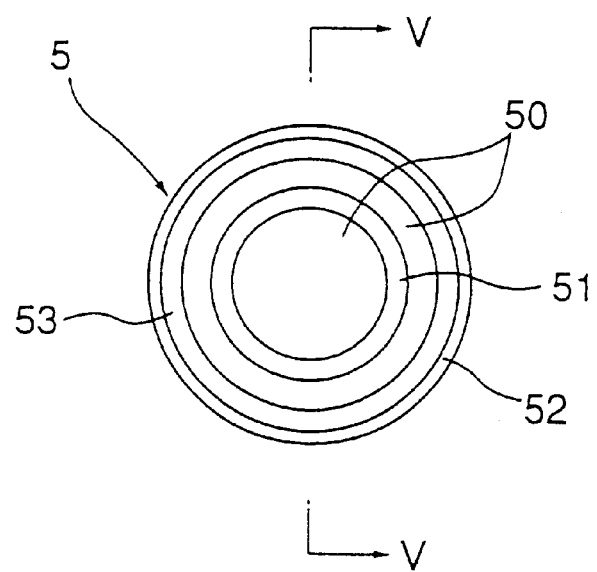
FIG. 4 is a front view showing the rolling element spacer according to the 1st embodiment.
Figure 5:
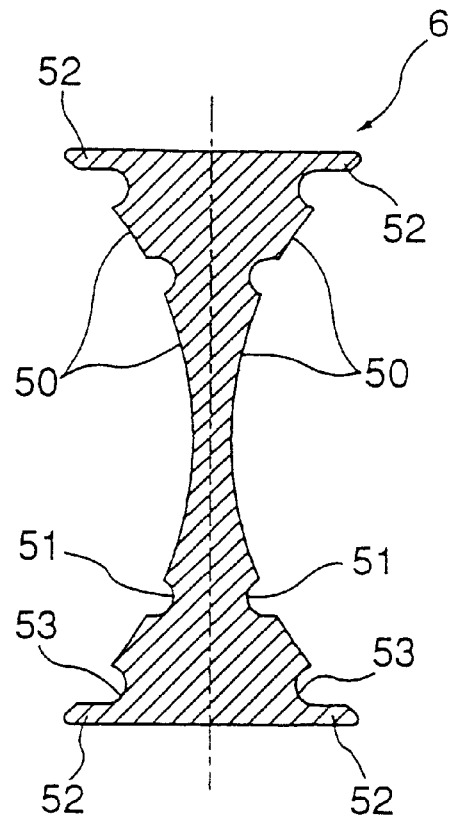
FIG. 5 is a sectional view along a V—V line in FIG. 4.

In this ball screw device, in order to prevent the balls 2 incorporated in the endless circulation passage from mutually contacting, a rolling element spacer 5 is interposed between the mutually adjoining balls 2, 2. As shown in FIG. 3 to FIG. 5, the rolling element spacer 5 is formed by deforming a synthetic resin into an approximately disk form and, in its both front/rear faces, there are respectively formed ball holding seats 50 with which the balls 2 sliding-contact. The ball 2 and the rolling element spacer 5 are alternately arranged in the endless circulation passage. By this, it is adapted such that the balls 2 rolling in the endless circulation passage are prevented from mutually contacting, a smooth circulation of the ball and, in turn, smoothening of the rotary motion of the nut member 3 relative to the screw shaft 1 are intended, and additionally a generation of noise owing to a collision between the balls during an operation of the ball screw device is reduced.

Figure 6:
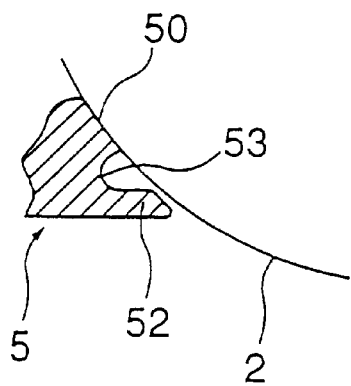
FIG. 6 is an enlarged sectional view showing a relation between a dropout prevention portion of the rolling element spacer according to the 1st embodiment and a ball.

The ball holding seat 50 is formed in a concave spherical face form nearly approximating a spherical face of the ball 2, and it is constituted such that the adjoining ball 2 contacts with the ball holding seat 50 almost without a gap. Further, an annular lubricating oil sump 51 is formed in the ball holding seat 50, and it is adapted such that a lubrication between the ball holding seat 50 and the ball 2 is intended. Further an annular dropout prevention portion 52 is formed around the ball holding seat 50 so as to surround the ball holding seat 50. A tip of the dropout prevention portion 52 protrudes than an edge portion of the ball holding seat 50 with respect to a arranging direction of the balls 2 (horizontal direction in FIG. 5). However, as shown in FIG. 6, it is adapted such that, under a state that the ball 2 seats on the ball holding seat 50, a gap is formed between the ball 2 and the tip of the dropout prevention portion 52. Additionally, between the dropout prevention portion 52 and the ball holding seat 50, there is formed an annular groove 53 separating them, and it is adapted such that the annular groove 53 functions as a lubricating oil sump.

Figure 7:
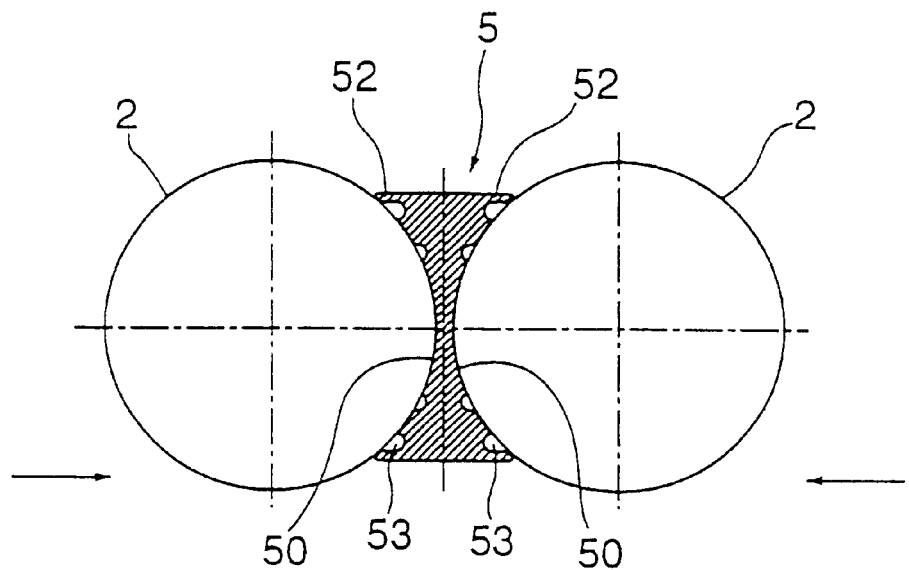
FIG. 7 is sectional view showing a state that the balls seat on ball holding seats of the rolling element spacer according to the 1st embodiment.

FIG. 7 shows a state that the balls 2 seat on the ball holding seats 50 of the rolling element spacer 5. As mentioned before, since the ball holding seat 50 is formed in the concave spherical face form nearly approximating the spherical face of the ball 2, the seated ball 2 contacts with the ball holding seat 50 almost without the gap as shown in this drawing. By this, in case that the balls 2 and the rolling element spacers 50 are arranged without gaps in the endless circulation passage of the ball screw device, the balls 2 don't rock unstably on the ball holding seats 50 of the rolling element spacers 5, so that the balls 2 and the rolling element spacers 5 can be circulated without meandering in the endless circulation passage.

Further, since the dropout prevention portion 52 formed around the ball holding seat 50 does not contact with the ball 2 seated on the ball holding seat 50, it follows that a lubricant such as grease adhered on the ball 2 enters into the annular groove 53 from a gap between the dropout prevention portion 52 and the spherical face of the ball 2 and is collected in the annular groove 53. Therefore, the lubricant is liable to be drawn between the ball 2 and the ball holding seat 50 which mutually sliding-contact, so that it is possible to surely lubricate between the ball 2 and the rolling element spacer 5 and, besides, the lubricant becomes liable to adhere also to a surface, of the ball 2, moving outside after passing the annular groove 53, so that it becomes possible to surely lubricate between the ball 2 and the rolling groove 10 of the ball screw device.

Figure 8:
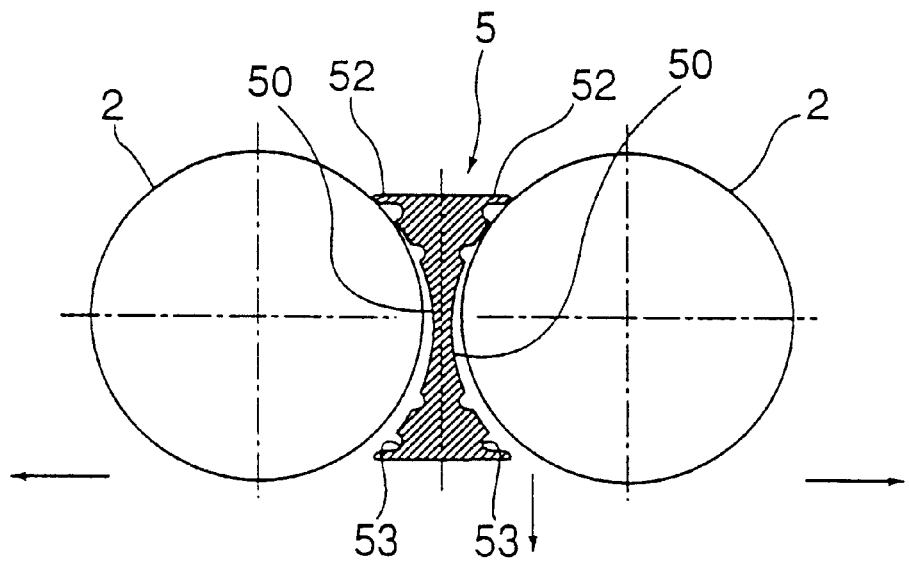
FIG. 8 is a sectional view showing a state that the balls float from the ball holding seats of the rolling element spacer according to the 1st embodiment.

On the other hand, FIG. 8 shows a state that a gap between the mutually adjoining balls 2 increases during circulating in the endless circulation passage, and thus the balls 2 float from the ball holding seats 50 of the rolling element spacer 5. Such a state occurs somewhere in the endless circulation passage because it is difficult to arrange the balls 2 and the rolling element spacers 5 without gaps relative to the endless circulation passage of the ball screw device for instance, and the ball 2 and the rolling element spacer 5 wear during being used for a long time. And, if the balls 2 float from the ball holding seats 50 in the above manner, the rolling element spacer 5 sandwiched by the balls 2 from both sides loses its support and attempts to fall out from between the balls 2. However, in the rolling element spacer 5 of this embodiment, since the tip of the dropout prevention portion 52 protrudes than the edge portion of the ball holding seat 50 with respect to the arranging direction of the balls 2, if the rolling element spacer 5 becomes likely to drop out from between the mutually adjoining balls 2, the dropout prevention portions 52 having been in a non-contacting state up to that time engage with the balls 2, thereby acting so as to prevent the rolling element spacer 5 from falling out from between the balls 2. Accordingly, in the rolling element spacer 5 of this embodiment, it is unnecessary to set a diameter of the ball holding seat 50 uselessly large for the purpose of dropout prevention from between the balls 2, so that the ball holding seat 50 can be formed in a size as minimum as necessary. Therefore, a contact area between the ball 2 and the ball holding seat 50 can be made small, so that a sliding contact resistance of the ball 2 with respect to the rolling element spacer 5 can be reduced correspondingly. From a viewpoint of the ball screw device in which the rolling element spacers 5 are arranged in the endless circulation passage, this fact leads to an achievement of a motion whose torque fluctuation is little and which is smooth.

Figure 9:
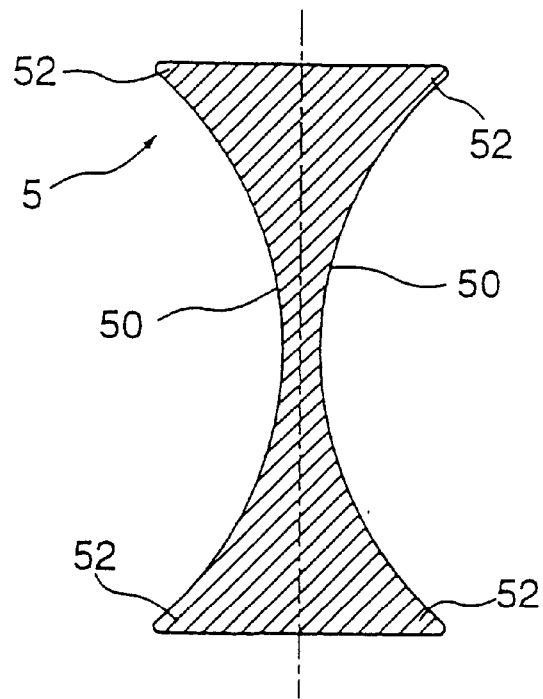
FIG. 9 is a sectional view showing an example in which an annular groove and a lubricating oil sump are omitted from the rolling element spacer according to the 1st embodiment.
Figure 10:
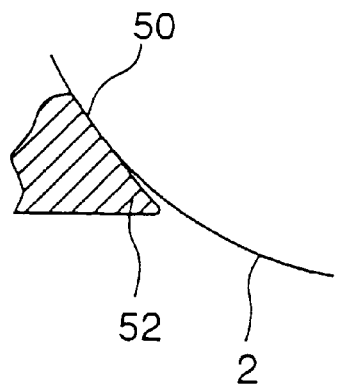
FIG. 10 is an enlarged sectional view showing a relation between the dropout prevention portion of the rolling element spacer shown in FIG. 9 and the ball.

Incidentally, in the rolling element spacer 5 of the aforesaid 1st embodiment, the annular groove 53 is formed between the ball holding seat 50 and the dropout prevention portion 52, and the annular lubricating oil sump 51 is formed in the ball holding seat 50 but, as shown in FIG. 9, the annular groove 53 and the lubricating oil sump 51 may be omitted in the invention. However, even in this case, as shown in FIG. 10, the dropout prevention portion 52 does not contact with the spherical face of the ball 2 seated on the ball holding seat 50, and a gap is formed between the dropout prevention portion 52 and the spherical face of the ball 2. By this, since the lubricant such as grease adhered on the ball 2 enters into the gap, the lubricant becomes liable to be drawn into between the ball 2 and the ball holding seat 50 which mutually sliding-contact although an amount of the lubricant held in the gap is reduced in comparison with a case in which the annular groove 53 is formed, so that it becomes possible to surely lubricate between the ball 2 and the rolling element spacer 5.

Figure 11:
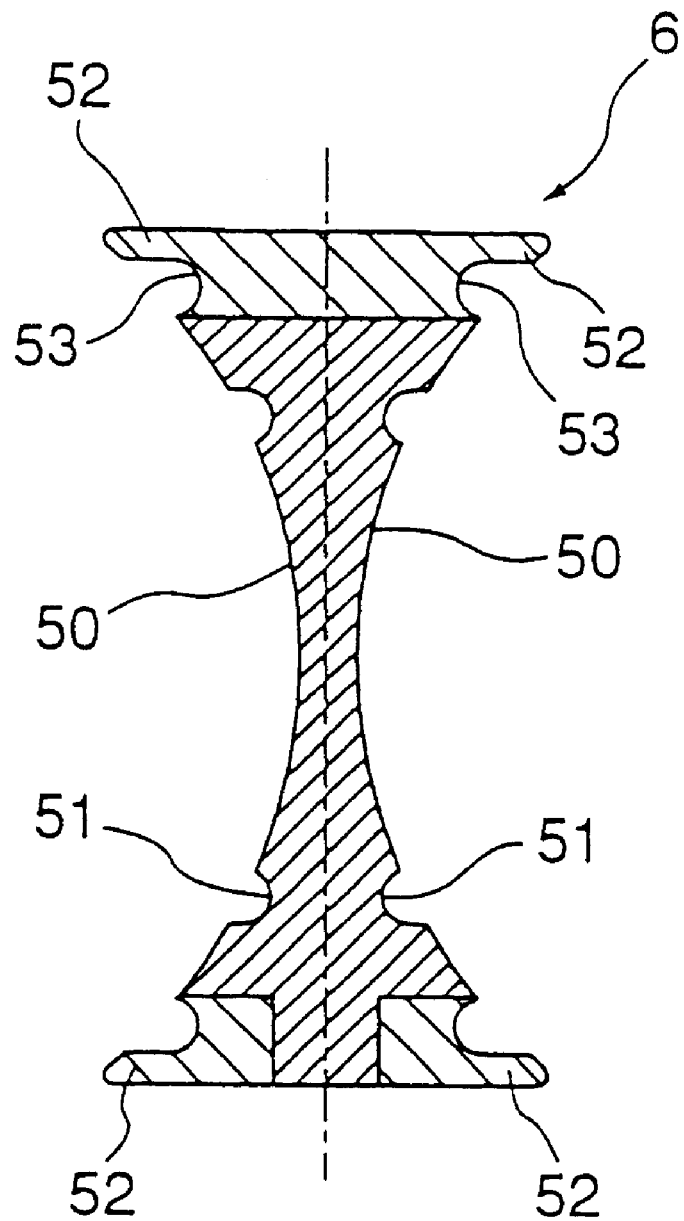
FIG. 11 is a sectional view showing a 2nd embodiment of the rolling element spacer of the invention.

FIG. 11 shows a 2 nd embodiment of the rolling element spacer of the invention.

In the rolling element spacer 5 of the aforesaid 1st embodiment, the ball holding seat 50 and the dropout prevention portion 52 are injection-molded integrally from a single synthetic resin. However, in a rolling element spacer 6 of the 2nd embodiment, the ball holding seat 50 and the dropout prevention portion 52 are molded respectively by different synthetic resins. Incidentally, since other constitutions are common to the rolling element spacer 5 of the 1st embodiment, the same reference numerals as the 1st embodiment are affixed in FIG. 11, and detailed explanations thereof are omitted here.

Since the rolling element spacer performs a role of cushion between the mutually adjoining balls 2 to there by reduce generations of fatigue and noise of the balls 2 owing to a collision, it is preferable that the ball holding seat 50 is formed of a suitably soft material in order to be able to sufficiently exhibit this function. However, since the dropout prevention portion 52 is one which, in case that a spacing between the mutually adjoining balls 2 becomes increased, engages with the ball 2 to thereby prevent the rolling element spacer from falling out, it is preferable that it is formed of a hard material in order not to be deformed easily. Here, as an aim of selecting a resin material for molding the dropout prevention portion and the ball holding seat, a bending modulus of elasticity of such a synthetic resin can be made the aim. That is, this is because it is considered that a material whose bending modulus of elasticity is small deforms easily, while a material whose bending modulus of elasticity is large is difficult to deform.

Accordingly, according to the rolling element spacer 6 of the 2nd embodiment, the dropout prevention portion 52 can be molded by a hard synthetic resin in comparison with the ball holding seat 50, so that it become possible to exhibit in maximum the functions of the respective portions.

What is claimed is:

1. A rolling element spacer used in a rolling guide device in which a pair of members perform a relative continuous motion through an endlessly circulating ball row, interposed between balls mutually adjoining in an endless circulation passage, and circulating together with the balls, the spacer comprising:

a pair of ball holding seats, each ball holding seat has a concave spherical face approximating a spherical face of the ball and that makes sliding contact with the ball;

an annular dropout prevention portion formed around each ball holding seat and that protrudes in a ball arranging direction from an edge portion of the ball holding seat and does not contact the ball seated on the ball holding seat; and wherein the ball holding seat and the dropout prevention portion are integrally formed from a single synthetic resin.

2. The rolling element spacer according to claim 1, wherein an annular groove is formed between the ball holding seat and the dropout prevention portion, wherein the annular groove functions as a lubricating oil sump.

3. The rolling element spacer according to claim 1, wherein a lubricating oil sump is formed in the ball holding seat.

* * * * *